United States Patent
Koberstein et al.

[15] 3,669,906
[45] June 13, 1972

[54] CATALYST FOR PURIFICATION OF EXHAUST GASES FROM MOTOR VEHICLES AND INDUSTRIAL PLANTS

[72] Inventors: Edgar Koberstein, Alzenau; Eduard Lakatos, Hurth-Hermulheim, both of Germany

[73] Assignee: Deutsche Gold-und Silber-Scheideanstalt Vormats Roessler, Frankfurt (Main), Germany

[22] Filed: Aug. 19, 1970

[21] Appl. No.: 64,957

Related U.S. Application Data

[63] Continuation-in-part of Ser. No. 581,163, Sept. 22, 1966, abandoned.

[30] Foreign Application Priority Data

Sept. 24, 1965 Germany..............................D 48276

[52] U.S. Cl. ..........................252/465, 252/466 J, 252/468, 252/470, 252/475, 23/2 E
[51] Int. Cl. ......................................B01j 11/06, B01j 11/22
[58] Field of Search.......................252/465, 466 J, 470, 468; 23/2 E, 288 F

[56] References Cited

UNITED STATES PATENTS

| | | | |
|---|---|---|---|
| 3,317,439 | 5/1967 | Stiles | 252/465 X |
| 3,360,330 | 12/1967 | Hoekstra | 252/465 X |
| 3,444,099 | 5/1969 | Taylor et al | 252/465 |
| 3,493,325 | 2/1970 | Roth | 252/465 X |
| 3,498,927 | 3/1970 | Stiles | 252/465 X |

*Primary Examiner*—Daniel E. Wyman
*Assistant Examiner*—W. J. Shine
*Attorney*—Cushman, Darby & Cushman

[57] ABSTRACT

There is provided a catalyst for the purification of exhaust gases from industrial processes and motor vehicles by combustion of oxidizable impurities contained therein to carbon dioxide and water and removal of nitrogen oxide at elevated temperatures in contact with air consisting essentially of a calcined mixture of eta and gamma aluminum oxide and heavy metal oxide compounds the element chromium and at least one other heavy metal selected from the group consisting of nickel or copper with nickel, the quantity of such heavy metal oxide compounds being 55 to 90 weight percent, the molar proportion of the chromium to the other heavy metal being between about 1:0.5 and 1:2.5 calculated as oxides and the majority of the particles of the heavy metal oxide compounds being of a size of from 0.5 to 5 $\mu$, whereby the heavy metal oxide compounds have been formed by precipitating chromium from a solution of ammonium bichromate with a soluble salt of said other heavy metal or metals, and whereby said calcining of said mixture having been done at 400°–800° C., preferably in an oxygen-containing atmosphere.

19 Claims, No Drawings

CATALYST FOR PURIFICATION OF EXHAUST GASES FROM MOTOR VEHICLES AND INDUSTRIAL PLANTS

This application is a continuation-in-part of Koberstein et al. application, Ser. No. 581,163, filed Sept. 22, 1966 and now abandoned.

The present invention relates to a catalyst for oxidation reactions which proceed at higher temperatures which is capable of oxidizing the most varied organic compounds, as well as, carbon monoxide and of removing the nitrogen oxids, such as, are, for example, contained in the exhaust gases from industrial processes and motor vehicles, in contact with air to produce the stable end products carbon dioxide, water and nitrogen.

It is known that catalysts built up from aluminum oxide, copper oxide, chromium oxide or other heavy metal oxides can be used for the above mentioned reactions. The behavior of such catalysts under operating conditions and their commercial applicability, however, in part depends upon the character of the composition of the catalyst and furthermore often is dependent upon the special processing conditions employed in its production. Processes which are to purify the noxious components in exhaust gases before they are released to the atmosphere by reactions which convert such noxious components into the harmless compounds carbon dioxide, water and nitrogen must, especially when applied to exhaust gases of motor vehicles, fulfill a number of requirements which are hard to meet and which in some instances even are contradictory. The catalysts for such processes must start the reactions at as low temperatures as possible and provide for a high percentage conversion of the compounds to be converted in all of the temperature ranges and space velocities which come into consideration. In addition, they must possess a sufficient life time in order that the costs of the process are kept within endurable bounds. Furthermore, such catalysts must have sufficient strength in order to be able to withstand the severe mechanical stresses during continuous operation. Also, they may not be poisoned by compounds contained in the exhaust gases which among others include the elements sulfur, phosphorus, lead and other well known catalyst poisons.

In many prior art catalysts of alumina and heavy metal oxides the alumina is used merely as a support, the heavy metal component being for example impregnated, adsorbed or precipitated on the alumina.

Experiments show that carrier catalysts containing usual amounts of heavy metal oxides (5 – 20 weight percent based on total catalyst weight) as well as catalysts as shown by U.S. Pat. No. 3,291,564 in the name of Kearby, which are impregnated with higher amounts of heavy metal oxides, e.g., up to 50 percent and more, failed high mileage automotive exhaust gas purification tests either due to fast solid state reactions between heavy metal oxide and carrier at high temperatures above 800° C. or due to reduction in mechanical strength. Similar results are published in Canadian Pat. Nos. 662,382 and 662,383.

Catalysts comprising an alumina support having a heavy metal oxide coating generally do not meet the high temperature requirements which can be encountered in the catalytic after-combustion of motor vehicle exhaust gases. For example a catalyst comprising an aluminum oxide support coated with $Cr_2O_3/CuO$ and enriched with BaO in proportions suggested by U.S. Pat. No. 3,291,564 was tested in driving experiments in accordance with the testing methods of the "California Test Procedure and Criteria for Motor Vehicle Exhaust Emission Control Board." According to the following results a rapid decrease of catalytic activity was found:

| Distance covered (Km) | Conversion of hydrocarbons after 4th deceleration |
|---|---|
| 0 | 90 % |
| 5,000 | 77 % |
| 10,000 | 70 % |
| 20,000 | 37 % |
| | Experiments discontinued. |

Furthermore where the aluminum oxide acts merely as a support or carrier for increased amounts of heavy metal oxides, the vibrations of vehicles and the intermittent pressure thrusts of the exhaust gases escaping from the engine causes the bond between carrier and coating, which is essential for that type of catalyst to be lost. Such catalysts do not fulfill the mechanical requirements necessary for practical use.

To illustrate the decomposition of such catalysts under vehicle vibrations and pressure thrusts alumina in tablet form (diameter 2 mm. height 3 mm.) was impregnated with copper salts and chromium salts from aqueous solutions and tempered up to a final temperature of 750° C. The catalyst then consisted of 55 percent by weight copper chromium oxides in a ratio of 2 $CuO/Cr_2O_3$ on an alumina support. The crushing strength of the original $Al_2O_3$ tablets was compared with that of the impregnated catalyst:

| | Crushing strength (Kp) |
|---|---|
| Original $Al_2O_3$ tablets | 10 – 13 |
| $Al_2O_3$ tablets with 55 % by wt. Copper Chromium oxide | < 1 |

The values of the foregoing table show that the mechanical stability of impregnated $Al_2O_3$ catalysts are by far too low for withstanding the severe conditions involved in practical automotive exhaust gas purification.

Furthermore the surfaces of the types of carrier catalysts mentioned above are comparatively large. The same is true with catalysts described in literature where a finely divided heavy metal component with particle sizes, e.g., below 500 A. is combined with an interspersing refractory of the same particle size to separate heavy metal oxide catalyst crystallites and prevent crystallite growth.

Extensive testing indicated that the large surface areas usually present with carrier catalysts are not useful for the purpose of automotive exhaust gas purification especially when leaded fuels are used. Large surfaces retain for example larger amounts of lead compounds thereby enabling reactions leading to catalyst poisoning and rapid deactivation. Another disadvantage of large surface area catalysts lies in the fact that extremely high temperatures are developed per volume unit of catalyst in case of unusual high concentrations of combustible compounds which can occur, e.g., by plug failure. Furtheron extremely high temperatures (above 1,500° C.) may lead to the deconstruction of the complete purification unit.

Now, however, the surprising discovery has been made, that catalysts consisting essentially of a calcined mixture of eta and gamma-aluminum oxide and heavy metal oxide compounds containing the element chromium and at least one other heavy metal selected from the group consisting of nickel or copper with nickel, the quantity of such heavy metal oxide compounds being 55 to 90 weight percent, the molar proportion of the chromium to the other heavy metal being between about 1 : 0.5 and 1 : 2.5 calculated as oxides, and the majority of the particles of the heavy metal oxide compounds being of a size of from 0.5 to 5 $\mu$, whereby the heavy metal oxide compounds have been formed by precipitating from a solution of ammonium bichromate with a soluble salt of said other heavy metal or metals and whereby said calcining of said mixture having been done at 400° – 800° C., preferably in an oxygen containing atmosphere, show great activity, mechanical and chemical durability and insensibility to high temperatures.

The catalysts according to the invention may contain a relatively small quantity of one or more elements of Group II A of the periodic system. The presence of such Group II A elements in chromium oxide catalysts effects a stabilization of such catalysts. The quantity of the Group II A element in the heavy metal component plus Group II A element is about 0.5 to 10 weight percent calculated as oxides.

A particularly preferred Group II A element is barium. The group II A element is suitably introduced to the catalyst composition as an addition to the oxide of copper and chromium, e.g., by coprecipitation.

The aluminum oxide contained in the catalyst of the invention acts as a catalytically active binder not as a carrier or interspersant.

Its effect on the catalytic properties of the catalytic system is due to a partial formation of prephases, which contain many catalytic active centers. Using aluminum oxide as a carrier would only lead to a fast consumption of the total heavy metal oxide layer or impregnation, resulting in the formation of rather undisturbed spinell lattice the catalytic activity of which is much lower due to the lower number of active centers in undisturbed crystals. It is therefore a very important object of the invention to use the heavy metal component in the form of relative coarse particles in an amount which prevails with regard to the amount of aluminum oxide.

An interspersant effect of the aluminum oxide which would imply particle sizes of both heavy metal component and interspersant below 500 A. is avoided in the catalysts of invention by using the coarse particles of heavy metal oxide compounds (0.5 to 5 $\mu$).

According to a preferred embodiment of the invention the content of heavy metal oxide compounds is about 70 weight percent.

The catalysts according to the invention may contain besides the element chromium the element nickel or the elements nickel and copper. The use of heavy metal oxide compounds consisting of chromium, nickel and copper is preferred. The molar ratio of the chromium to the other heavy metal or metals, being between about 1 : 0.5 and 1 : 2.5 calculated as oxides, is critical with respect to the longtime performance of the catalyst and a low firing temperature.

The heavy metal oxide compounds of the catalyst of the invention may be prepared by precipitating from a solution of ammonium bichromate and nitrate of the other heavy metal. Also mixtures of separately coprecipitated heavy metal compounds can be used as the heavy metal oxide component.

Thereby for example a nickel chromium oxide can be made by coprecipitation of ammonium bichromate and nickel nitrate which subsequently is mechanically mixed with a chromium copper oxide made by coprecipitation of ammonium bichromate and copper nitrate.

The eta and gamma-aluminum oxide component of the catalyst of invention may be obtained by calcining precipitated aluminum oxide hydrates comprising boehmite and bayerite.

In accordance with the invention the catalyst may be prepared by mixing eta and gamma-aluminum oxide mixture, wetted with nitric acid, with the heavy metal oxide compounds, drying the resultant mixture, moulding it and calcining it at a temperature up to 800° C.

A preferred way for producing the catalyst of the invention is to mix aluminum oxide hydrate with the heavy metal oxide compounds, drying the mixture, moulding it and calcining it at temperatures up to 800° C.

The heavy metal oxide compounds are usually prepared by coprecipitation, calcination of the precipitate and subsequent sieving out of a fraction of a particle size of 0.5 to 5.0 $\mu$. According to known methods of precipitation the precipitation conditions may be chosen so that the majority of the particles of the heavy metal oxide compounds are obtained in the size desired.

The moulding of the catalyst is preferably carried out in the presence of a pressing agent, e.g., graphite or stearic acid by using extruders or tablet pressing machines.

The most preferred method of carrying out the process for production of the catalyst of the invention comprises the sequential steps of mixing a freshly prepared aluminum hydroxide press cake with calcined powdered oxide of the heavy metals of a particle size mainly from 0.5 to 5 $\mu$ (preferably 1 to 5 $\mu$), if desired containing at least one compound of at least one element of Group II A of the Periodic Table, drying, grinding (for example in a corundum disc mill) the dried composition to grain sizes below 100 $\mu$, treating the ground composition, preferably at room temperature, with an acid selected from the group consisting of mineral acids and aliphatic acids, subsequently mixing with a pressing agent (e.g., graphite or stearic acid), moulding the product (e.g., in an extruder to form an extrudate or in a preforming press to form tablets) drying (preferably at 120° C.) and calcining the dried product at a temperature of at least 800° C. This calcination step is preferably carried out by gradually increasing the temperature to at least 800° C.

The expression heavy metal oxide compounds as used above is defined as chromium oxide in admixture with or combined with nickel oxide and — if present — copper oxide and the expression includes nickel-(copper-)chromites, nickel-(copper-)chromium spinell, transition structures and mixtures thereof.

The acid used in the process of the invention may be a mineral acid, e.g., hydrochloric and sulphuric acid or nitric acid (preferably nitric acid) or an aliphatic carboxylic acid e.g., lactic acid, citric acid, acetic acid or propionic acid (preferably acetic acid).

Further in accordance with the invention there is provided a method for purifying internal combustion engine exhaust gas containing residual impurities which comprises contacting said exhaust gas at elevated temperatures in the presence of air with a catalyst consisting essentially of the calcined mixture of eta-gamma-aluminum oxides and heavy metal oxide compounds containing the element chromium and at least one other heavy metal selected from the group consisting of nickel or copper with nickel, the quantity of such heavy metal oxide compounds being 55 to 90 weight percent, the molar proportion of the chromium to the other heavy metal being between about 1 : 0.5 and 1 : 2.5 calculated as oxides and the majority of the particles of the heavy metal oxide compounds being of a size of from 0.5 to 5 $\mu$, whereby the heavy metal oxide compounds have been formed by precipitating from a solution of ammonium bichromate with a soluble salt of said other heavy metal and whereby said calcining of said mixture having been done at 400° – 800° C in an oxygen-containing atmosphere.

The expression "in the presence of air" includes the presence of air separately added to the exhaust gases as well as the presence of surplus air contained in the exhaust gases at lean carburetor settings.

Surprisingly it has been found that the catalyst of the invention promotes the conversion of nitrogen oxide to nitrogen by reaction with carbon monoxide even in the presence of oxygen.

The following examples serve to illustrate the catalysts according to the invention and their utility in purifying exhaust gases.

EXAMPLE 1

A mixed precipitate of nickel-chromium oxide containing 6 weight percent of barium (on dry substance) calculated as barium oxide was prepared by coprecipitation from a solution containing 6.68 kg of ammoniacal ammonium bichromate, 13.8 kg of nickel nitrate as well as 1.38 kg of barium nitrate. The precipitated material was separated from the liquid on a suction filter and dried in air for 10 hours at 120° – 130° C., subsequently comminuted and heated in a muffle furnace in this form for 1 hour at 350° – 400° C. A 0.5 to 5 $\mu$ fraction of the powder was then mixed with aluminum oxide hydrate in a weight proportion of 70 : 30 (calculated on dry oxides), peptized with nitric acid, kneaded and again dried at 100° C. The resulting cake was crushed to a suitable grain size (about 60 $\mu$) and after admixture with about 4 percent of stearic acid as molding assistant shaped in a revolving tabletting machine. The dimensions of the tablets produced were 5 × 3 mm. Subsequently the catalyst was calcined at 500° – 800° C.

EXAMPLE 2

A mixed precipitate of copper-nickel-chromium oxide containing 6 weight percent of barium (on dry substance) calculated as barium oxide was prepared by coprecipitation from a solution containing 6.68 kg of $(NH_4)_2Cr_2O_7$, 5.77 kg Cu(NO$_3$)$_2$·3 H$_2$O, 6.94 kg Ni(NO$_3$)$_2$·6 H$_2$O as well as 1.38 kg of Ba(NO$_3$)$_2$. The precipitated material was separated from the liquid on a suction filter and dried in air for 10 hours at 120° – 130° C., subsequently comminuted and heated in a muffle furnace in this form for 1 hour at 350° – 400° C. and sieved to a fraction with particles from 0.5 – 5.0 μ.

7 kg of the powder was then mixed with 3.53 kg of aluminum oxide of the gamma-series (solid content of the Al$_2$O$_3$: 84.5 percent) which had bee peptized with 360 ml HNO$_3$ (specific gravity 1.3) and 3,600 ml H$_2$O, mixed with 400 g graphite powder and kneaded. It was then extruded to extrudates of 2 mm diameter and 5 mm length. The extrudates were dried at 110° C. for 10 hours and then calcined at 800° C. in an air stream by stepwise increasing the temperature to this value.

EXAMPLE 3

8 kg of a nickel-chromium oxide (majority of particles 0.5 – 5.0 μ) produced according to Example 1 and 8 kg of a copper-chromium oxide (majority of particles 0.5 – 5.0 μ) produced by coprecipitation from a solution containing 6.3 kg of ammoniacal ammonium bichromate and 12.1 kg of copper nitrate and subsequent drying at 120° C. and calcination at 400° C. were mixed with 100 kg of freshly precipitated and filter pressed aluminum hydroxide in a kneader for 3 hours and then dried for 12 hours in a chamber oven at 110° C. Thereafter the material was crushed and ground in a disc mill to grain sizes below 100 μ. This powder after peptizing with acetic acid was then mixed with graphite as a molding agent as well as water until it had a proper consistency for molding. It was then extruded to form rods. Depending upon the extrusion press adjustment, extrudates of 4 mm in diameter were obtained. Before use such extrudates were subjected to calcination in a stream of oxygen at a temperature of 800° C. by stepwise increasing the temperature up to this value.

The 100 kg of freshly precipitated filter pressed aluminum hydroxide corresponded to 6.8 kg of aluminum oxide.

EXAMPLE 4

The catalyst prepared according to Example 3 was placed in a muffler attached to the exhaust line of a motor vehicle and tested in a road test corresponding to the directions of the "California Test Procedure and Criteria for Motor Vehicle Exhaust Emission." In such test the motor vehicle was driven according to a prescribed test schedule which includes systematically determined sections of city traffic, country road and express highway. After about each 3,000 miles the efficiency of the catalytic after burner unit is tested on a dynamometer (according to the above mentioned test procedure). In such efficiency test the vehicle is taken through an exactly prescribed driving cycle and the exhaust gases continuously analyzed with the aid of infra red apparatus for their content in hydrocarbons, carbon monoxide and carbon dioxide. An exact observance of the directions given in such test procedure is essential as only then is truly comparable data obtained. The following table gives the degrees of conversion of the hydrocarbons and of the carbon monoxide in the catalytic after burner unit under decelerating driving conditions as according to experience such conditions cause highest incidence of hydrocarbons in the exhaust.

| Distance driven km | Conversion | |
|---|---|---|
| | Hydrocarbons % | (4 Decel.) CO % |
| 0 | 99 | 94 |
| 5,000 | 93 | 75 |
| 20,000 | 84 | 68 |

EXAMPLE 5

The catalyst prepared according to Example 1 was tested as in Example 4. The results are tabulated below:

| Distance driven km | Conversion | |
|---|---|---|
| | Hydrocarbons % | (4 Decel.) CO % |
| 0 | 95 | 84 |
| 10,000 | 84 | 69 |

A comparison of the conversions obtained in Examples 4 and 5 indicates the favorable influence of the oxygen treatment used in the preparation of the catalyst of Example 3. If the oxygen treatment of Example 3 is omitted but the preparation of the catalyst is otherwise the same, the results obtained with the catalyst thus produced in the motor vehicle test are practically the same as in Example 4.

EXAMPLE 6

The catalyst prepared according to Example 3 was tested as in Example 4. Another form of the above mentioned catalytic afterburner device consists of two separate housings for the catalyst connected with each other (dual-converter). In one test secondary air was introduced in front of the first catalyst bed arranged in the first housing. In a second test secondary air was introduced in front of the second catalyst bed arranged in the second housing.

The test results are included in the following table:

| Test conditions (first catalyst bed) | NO -content × inlet value (ppm) | NO -content × outlet value (ppm) | conversion factor % |
|---|---|---|---|
| with secondary air | 1460 | 846 | 42 |
| without sec. air | 1440 | 274 | 81 |

The nitrogen oxide content was determined by an infra red analyzer.

EXAMPLE 7

The catalysts produced by the methods described in Examples 1 to 3 exhibit good mechanical strengths which are of considerable significance when such catalysts are used. For example, they have favorable abrasion resistance and crushing strength values. Such crushing strength was measured by determining the pressure in kg required to crush a tablet or extrudate of the catalyst. In each instance 100 shaped particles were tested and the results evaluated statistically. The catalysts produced by the methods of Examples 1 to 3 always had a crushing strength of more than 12 kg.

EXAMPLE 8

An exhaust gas from a reaction chamber of a chemical industrial plant which contained ammonia and lower amounts of mercapto compounds caused a strong irritation of the surroundings due to bad smell. The exhaust gas was led over the catalyst prepared according to Example 1 with a space velocity of 4,000 h$^{-1}$. Due to the combustion heat of the ammonia a temperature of 580° C. was generated. The purified gas emanating from the catalyst bed was led through a chimney into the open air. This gas was free of any order.

We claim:

1. A catalyst for the purification of exhaust gases from industrial processes and motor vehicles by combustion of oxidizable impurities contained therein to carbon dioxide and water and removal of nitrogen oxide at elevated temperatures in contact with air consisting essentially of a calcined mixture of eta and gamma-aluminum oxide and heavy metal oxide compounds containing the element chromium and at least one other heavy metal selected from the group consisting of nickel or copper with nickel, the quantity of such heavy metal oxide compounds being 55 to 90 weight percent, the molar proportion of the chromium to the other heavy metal being between about 1 : 0.5 and 1 : 2.5 calculated as oxides and the majority of the particles of the heavy metal oxide compounds being of a size of from 0.5 to 5 μ, whereby the heavy metal oxide compounds have been formed by precipitating from a solution of ammonium bichromate with a soluble salt of said other heavy metal or metals, and whereby said calcining of said mixture having been done at 400° – 800° C. in an oxygen-containing atmosphere.

2. The catalyst of claim 1, in which said catalyst also contains at least one compound of an element of Group II A of the periodic system, the quantity of Group II A element being 0.5 to 10 weight percent of the heavy metal compounds plus group II A element calulated as oxides.

3. The catalyst composition according to claim 2, wherein said at least one compound of a Group II A element is a barium compound.

4. The catalyst according to claim 1, wherein the barium is added to the heavy metal oxide compounds by coprecipitation.

5. The catalyst of claim 1, in which the content of heavy metal oxide compounds is about 70 weight percent.

6. The catalyst of claim 1, in which the other heavy metal is nickel.

7. The catalyst of claim 1, in which other heavy metals are nickel and copper.

8. The catalyst of claim 1, in which the heavy metal oxide compounds have been prepared by precipitating from a solution of ammonium bichromate and nitrate of the other heavy metal.

9. The catalyst of claim 1, in which the heavy metal oxide component is a mixture of separately coprecipitated heavy metal compounds.

10. The catalyst according to claim 1, wherein said aluminum oxide is obtained by calcining precipitated aluminum hydrates comprising boehmite and bayerite.

11. The catalyst of claim 1, which has been prepared by mixing eta and gamma-aluminum oxide, wetted with nitric acid, with the heavy metal oxide compounds, drying the resultant mixture, moulding it and calcining it at temperatures up to 800° C.

12. The catalyst of claim 1, which has been prepared by mixing aluminum oxide hydrate with the heavy metal oxide compounds, drying the resultant mixture and moulding it and calcining it at a temperature up to 800° C.

13. A process for preparing the catalyst of claim 1, wherein the heavy metal oxide compounds are prepared by coprecipitation, calcination of the precipitate and subsequent sieving out a powder of a particle size of 0.5 to 5.0 $\mu$.

14. A process for preparing the catalyst of claim 1, comprising moulding powdered catalyst in the presence of a pressing agent.

15. A process for preparing the catalyst of claim 14, wherein the pressing agent is selected from the group consisting of graphite and stearic acid.

16. A process for preparing the catalyst of claim 1, which comprises the sequential steps of mixing a freshly prepared aluminum hydroxide press cake with calcined powdered oxide of the heavy metals of a particle size mainly from 0.5 to 5 $\mu$, drying, grinding the dried composition to particle sizes below 100 $\mu$, treating the ground composition with an acid selected from the groups consisting of mineral acids and aliphatic carboxylic acids, subsequently mixing with a pressing agent, moulding the product, drying at about 120° C., and calcining the dried product at a temperature of at least 800° C. by gradually increasing the temperature.

17. A process for preparing the catalyst of claim 2, which comprises the sequental steps of mixing a freshly prepared aluminum hydroxide press cake with calcined powdered oxide of the heavy metals of a particle size mainly from 0.5 to 5 $\mu$, and containing at least one of the elements Be, Mg, Ca, Sr, Ba, drying, grinding the dried composition to particle sizes below 100 $\mu$, treating the ground composition with an acid selected from the groups consisting of mineral acids and aliphatic carboxylic acids, subsequently mixing with a pressing agent, moulding the product, drying at 120° C. and calcining the dried product by gradually increasing the temperature to at least 800° C.

18. A process according to claim 17, wherein the acid for treating the ground composition is nitric acid.

19. A process according to claim 17, wherein the acid for treating the ground composition is selected from lactic acid, acetic acid, citric acid and propionic acid.

* * * * *